April 27, 1965 K. G. AHLEN 3,180,094
HYDRODYNAMIC POWER TRANSMISSION WITH
ANGULARLY ADJUSTABLE BLADES
Filed Aug. 1, 1962 2 Sheets-Sheet 1
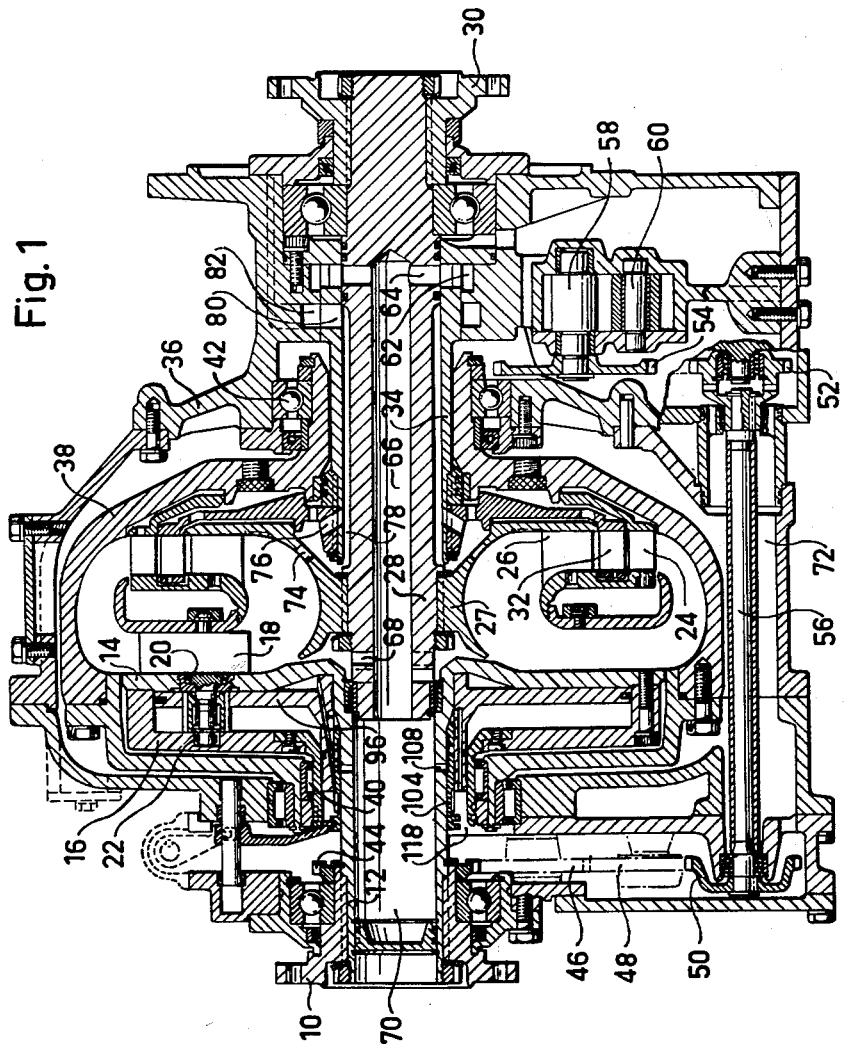
INVENTOR.
Karl G. Ahlen
BY
Jarvis C. Marble
ATTORNEY

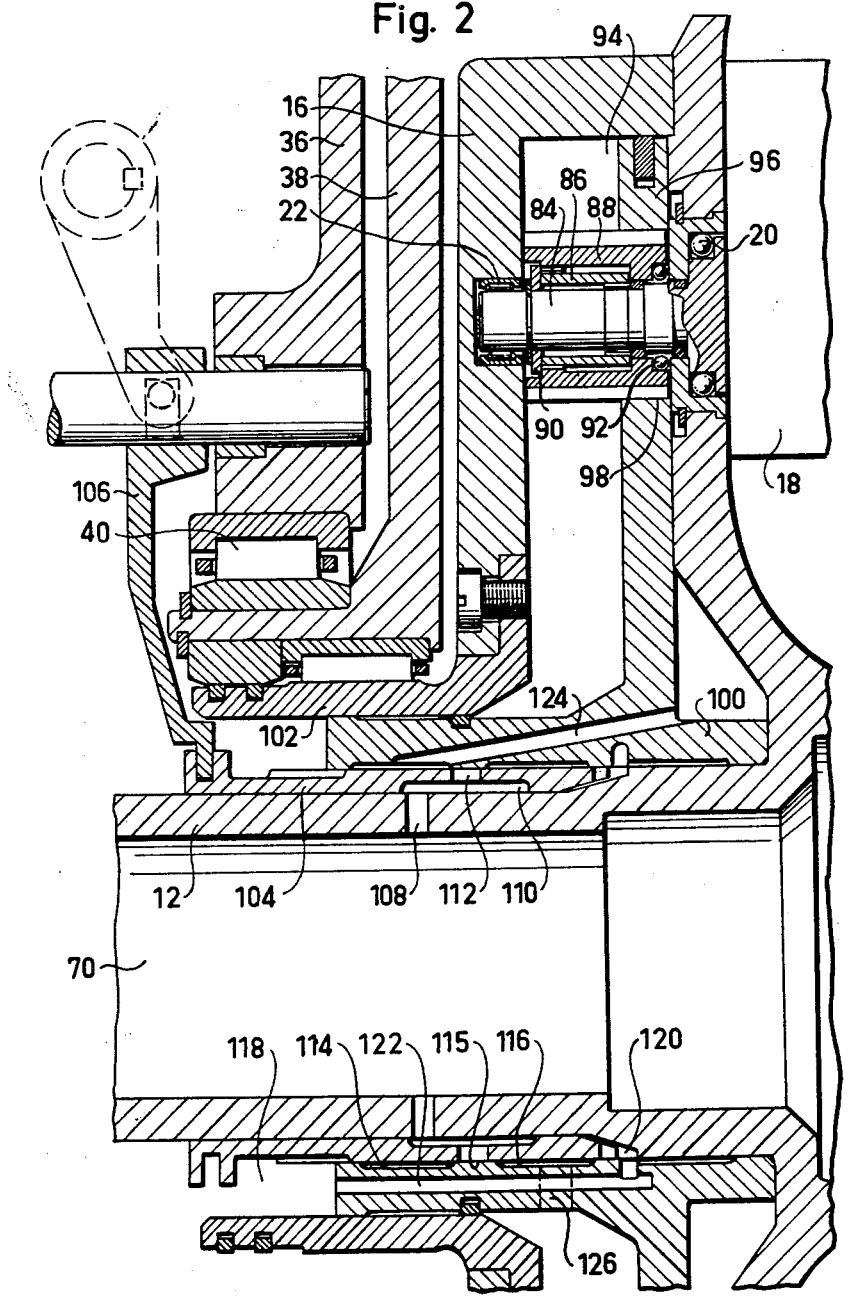

3,180,094
HYDRODYNAMIC POWER TRANSMISSION WITH ANGULARLY ADJUSTABLE BLADES
Karl Gustav Åhlen, Stockholm, Sweden, assignor to Svenska Rotor Maskiner Aktiebolag, Stockholm, Sweden, a company
Filed Aug. 1, 1962, Ser. No. 214,121
Claims priority, application Sweden, Aug. 8, 1961, 8,032/61
11 Claims. (Cl. 60—54)

The present invention relates to an operating device for blades angularly adjustable around their own axes located in a blade ring of hydrodynamic power transmission. The invention is preferable intended for rotatable blade rings, especially of the kind comprising pump blades of a torque converter angularly adjustable around their own axes. Torque converters of such a type are earlier known per se for instance through the United States Patent 2,935,898, granted Oct. 6, 1960. The hardest problem with such torque converters is to transmit the power required for the actuation of the blades in combination with sufficient accuracy of the setting, so that the setting mechanism is subject to a minimum of wear and has a minimum of backlash. In the device shown in the patent mentioned above the entire actuation power is transmitted through completely mechanical means operated from the outside of the converter. Since the setting mechanism thus acts as the actuation means it must be provided with the clearances which are necessary for the actuation means owing to the risk for seizing between the details forming the means while moving in relation to each other. The accuracy of the setting mechanism will in this way be reduced simultaneously as the actuating power will be large.

According to the invention the actuating means and the setting mechanism will be separate from each other. For this reason the actuating means will be operated by a servo motor and the setting mechanism will only influence the action of the servo motor. In this way the clearances of the setting mechanism required in the earlier known device is practically eliminated. As the setting mechanism is entirely free from the path of transmission of the power required to effect the adjustment of the blades, this mechanism has only to transmit the power necessary for its own setting. Since this power is very small the clearances and the backlash of the mechanism can be reduced very much so that the accuracy of the adjustment can be increased considerably.

Hydrodynamic power transmissions ordinarily employ oil under pressure for their normal operation and it is thus advantageous to make the servo motor hydraulically operated, with a pump driven from the primary side of the converter acting as the pressure oil source.

The more specific nature of the invention will be evident from the following detailed description of a suitable embodiment shown in the annexed drawings, in which FIG. 1 shows a longitudinal section through a torque converter according to the invention and FIG. 2 shows a detail of FIG. 1 on a larger scale.

A hydrodynamic torque converter is provided with a driving flange 10 nonrotatably connected with a tubular pump shaft 12. This shaft carries a pump member comprising two nonrotatably connected disks 14 and 16 in which a number of pump blades 18 are angularly adjustably mounted by bearings 20 and 22.

The torque converter is furthermore provided with two rings of turbine blades 24 and 26 nonrotatably connected with the turbine shaft 28 and the driven flange 30 by the turbine disk 27, and with a ring of reaction blades 32 nonrotatably connected with a reaction shaft and the stationary outer housing 36 of the converter. The blade rings are enclosed in a freely rotatable casing 38 mounted in the stationary housing 36 by bearings 40 and 42.

The pump shaft 12 is nonrotatably connected with a gear ring 44 which drives a gear pump 58, 60 mounted in the stationary housing by means of a number of gears 46, 48, 50, 52, 54 and a shaft 56. (The shaft 56 is for the sake of clearness brought up to the plane of the drawing.) This pump 58, 60 distributes oil under pressure through the channels 62 and 64 to the bore 66 in the turbine shaft 28. Through radial bores 68 in this shaft oil is admitted to the hydraulic working chamber located inside the rotating casing 38. At the same time oil is also admitted to the hollow space 70 of the pump shaft 12. Oil from the hydraulic working chamber is returned to the sump 72 and the pump 58, 60 through bores 74, 76 in the turbine disk 27 and the reaction shaft 34, through the annular channel 78 between the turbine and reaction shafts 28, 34, and through the radial bore 80 in the reaction shaft to the annular groove 82 in the stationary outer housing 36 from which groove it is drained to the sump 72.

The pivot 84 of each pump blade 18 is at its end facing the disk 14 nonrotatably connected with a sleeve 86 which in its turn close to the disk 16 with prestress is nonrotatably connected with an outer sleeve 88 provided with external helical teeth. The two sleeves 86 and 88 are through a key device 90 axially fixed relative to the pivot 84 and furthermore the sleeve 88 rests against the disk 14 by a thrust bearing 92. By means of this construction the sleeve 88 is firmly held against axial movement relative to the pivot 84, such movement in either direction being prevented by the engagement on the opposite sides of the disc 14 of the two thrust bearings 20 and 92. On the other hand the yielding connection between sleeves 88 and pivot 84, provided through the medium of the intermediate sleeve 86, permits slight movement of the sleeve 88 radially with respect to the axis of the pivot 84. In this connection, it is to be noted that the desired firm support for the rotatably mounted blade members, is provided by the axially widely spaced bearings 22 and 92 located respectively at either side and outside of the actuating connections and providing what is commonly known as a straddle mounting, rather than the usual overhung or cantilever mounting in which only a single bearing is employed.

The chamber 94 between the disks 14 and 16 is formed as a cylinder of a hydraulic motor. A piston 96 is enclosed in the cylinder 94 and adapted to sealingly cooperate with the barrel walls. The piston 96 is provided with a number of holes 98 corresponding to the number of the blades 18. Each hole 98 is provided with internal helical teeth for cooperation with the external teeth of the sleeve 88. The piston 96 is provided with an annular foot 100 which cooperates with the pump shaft 12 and an axial projection 102 of the disk 16 for guiding and sealing purposes. The foot 100 has a considerable axial length in order to prevent tilting of the piston 96 owing to variation in the load from the different blades 18. An axially slidable valve 104 is located between the foot 100 and the pump shaft 12, which valve is adapted to be adjusted by a fork 106.

A number of holes 108 are provided in the pump shaft 12. The holes 108 connect the hollow space 70 with an annular groove 110 in the internal barrel surface of the valve 104, which surface seals against the pump shaft 12, independently of the position of the valve 104. The groove 110 has an axial length at least corresponding to the sum of the axial length of the hole 108 and the distance between the end positions of the valve 104. A number of radial holes 112 are opened through the valve 104 from the groove 110 to the external barrel wall sealing against the foot 100 of the piston 96. The barrel wall of the foot 100 of the piston is furthermore provided with two annular grooves 114 and 116. The grooves 116 and 114 are located at such a distance from each other that the intervening barrel wall portion 115 can close the holes 112 but so that the wall portion 115 immediately opens a communication between the holes 112 and one or the other of the grooves 114, 116 for a small increment in one direction or the other of relative movement between the piston foot 100 and the valve 104. The two grooves 114, 116 have furthermore such an axial length in relation to the length of the valve 104 that when both the grooves 114, 116 are closed off from the holes 112 the barrel wall portions outside the grooves seal against external barrel wall portions of the valve 104, but so that when the holes 112 due to a relative displacement of the valve to the piston communicate with one of the grooves 114, 116 the other groove will communicate with the space 118, 120 axially outside the valve 104. The spaces 118 and 120 located at different ends of the valve communicate with each other through a bore 122 in the piston foot 100 and they communicate furthermore directly with oil sump 72. The grooves 114, 116 communicate by connecting bores 124, 126, respectively, with opposite sides of the piston 96.

The device for adjustment of the pump blades 18 functions in the following way: Pressure fluid is delivered from the pump 58, 60 to the hollow space 70. From the space 70 the fluid passes through the holes 108 to the groove 110 and the holes 112. Normally the holes 112 are sealed by the internal barrel wall portion 115 of the piston foot 100 lying between the grooves 114 and 116. If the valve 104 is moved to the left by the fork 106 there will immediately be a communication between the holes 112 and the groove 114 and through the bore 124 with the right side of the piston 96 so that pressure fluid is admitted to the part of the cylinder 94 lying between the piston 96 and the disk 14. Simultaneously there will also be a communication between the groove 116 and the space 120 with the result that the part of the cylinder 94 lying between the piston 96 and the disk 16 communicates with the sump 72 through the bore 126, the groove 116, the space 120, the bore 122 and the space 118. In this way the piston is moved to the left, i.e. in the same direction as the valve 104, till the groove 114 once more is sealed against the holes 112 and the groove 116 is sealed against the space 120. Upon the axial displacement of the piston 96 each pump blade 12 will simultaneously be correspondingly angularly adjusted owing to the helical teeth of the sleeve 88 and of the hole 98.

If the valve 104 is then displaced to the right by the fork 106 there will immediately be a communication between the holes 112 and the groove 116 and through the bore 126 with the left side of the piston 96 so that pressure fluid is admitted to the part of the cylinder 94 lying between the piston 96 and the disk 16. Simultaneously there will also be communication between the groove 114 and the space 118 resulting in that the part of the cylinder 94 lying between the piston 96 and the disk 14 communicates with the sump 72 through the bore 124, the groove 114 and the space 118. In this way the piston 96 is moved to the right, i.e. in the same direction as the valve 104, till the groove 116 once more is closed off from the holes 112 and the groove 114 is closed off from the space 118. Upon the axial displacement of the piston 96 each pump blade 12 will simultaneously be correspondingly angularly adjusted in the direction opposite to that of the angularly adjustment mentioned above owing to the helical teeth of the socket 88 and the hole 98.

The angle of the blade 12 can in this way be adjusted continuously and the blade can be set in any desired position whereby each axial position of the valve corresponds to a certain angular position of the blade.

If, owing to the action from the blades the piston 96 is moved away from the position set by the valve and thus is displaced in relation to the valve 104 there will immediately be communications between the two sides of the piston 96 with the pressure fluid source 70 and the sump 72, respectively, in a way corresponding to that related above for the displacement of the valve in relation to the piston. In this way returning forces are immediately produced bringing the piston 96 and thus the blades 18 back to the proper positions for which the valve is set.

Owing to the radial resilience mentioned above between the outer sleeve 88 and the pivot 84 of the blade 18 small errors in the division between the holes 98 and minor tilting of the piston 96 can be absorbed without binding of the piston whereby a high degree of certainty of the functioning of the adjusting device is assured.

The friction forces for actuation of the blades by the device have thus been decreased to a minimum while the irreversible function from the blades is quite positive.

The invention is not restricted to the shown embodiment but comprises all adjusting devices for blades in hydrodynamic torque converters independently of the way in which they are shaped, i.e. the invention comprises everything within the scope of the following claims.

I claim:

1. In a hydrodynamic power transmission, a rotatably mounted bladed component having a shaft portion and a disc portion extending radially therefrom, a ring of blade members carried by said component, said blade members being mounted to rotate about their own axes and having blade portions provided with pivots extending axially therefrom through a ring of apertures provided in the disc portion of said component, and a rotatably mounted annular adjusting member co-axial with and axially movable relative to the shaft portion of said component and means providing separate rotationally rigid connections between said adjusting member and each of said pivots for translating axial movement of said adjusting member into rotative movement of said pivots about their respective axes, each of said connections being radially yieldable with respect to the axis of the pivot to which it is connected.

2. Apparatus as defined in claim 1, in which said adjusting member comprises a hollow hub portion encircling the shaft portion of said component and a radially extending disc portion, said disc portion having a ring of openings therein registering with and through which said pivots extend.

3. Apparatus as defined in claim 2, in which said component includes a second disc portion fixed to the first mentioned disc portion radially outwardly of said pivots and extending radially inwardly in axially spaced relation from said first mentioned disc portion to join a hollow hub portion concentric with and radially spaced from said shaft portion.

4. Apparatus as defined in claim 3 in which the disc portion of said adjusting member forms a piston located between the two disc portions of said component, the outer perimeter of the piston and the hub portion of the adjusting member being in sealing engagement with co-operating portions of said component to provide fluid pressure chambers on opposite sides of said piston.

5. Apparatus as defined in claim 4 in which the hub portion of the adjusting member is located radially between and slidably engages both the shaft portion and the hollow hub portion of said component, the places of engagement between the hub portion of the adjusting member and the two different portions of the component engaged thereby being located on opposite sides of the piston portion of the adjusting member and axially substantially spaced from each other, to thereby present tilting and resultant binding of the adjusting member and to insure free sliding movement thereof.

6. Apparatus as defined in claim 5 in which said pivots are straddle mounted with respect to said piston by bearings located in the two axially spaced disc portions of said component.

7. Apparatus as defined in claim 6 in which the openings in the piston portion of said adjusting member are provided with internal helical threads and said connection includes a sleeve provided with external helical threads non-rotatably secured to and located around each of said pivots with the threads thereof engaging the threaded openings in said adjusting member.

8. Apparatus as defined in claim 7 in which each of said sleeves is radially spaced from its associated pivot and said connection further includes an intermediate sleeve located in the space therebetween, said intermediate sleeve being non-rotatably secured at axially spaced apart places to the threaded sleeve and to the pivot, respectively, and there being radial clearance spaces between the places of connection of the several concentrically arranged parts, whereby to provide a rotationally positive and radially yieldable connection between the connected parts.

9. Apparatus as defined in claim 7 in which the means for rotatably mounting each of said blade members includes a first thrust bearing between the blade member and the blade side of the disc through which the pivot extends, a second thrust bearing between the opposite side of said disc and said threaded sleeve and means engaging said sleeve and said pivot for positively holding said sleeve through the medium of said second thrust bearing against said opposite side of said disc, to thereby clamp the assembled relatively rotatable parts positively against relative axial movement.

10. In a hydrodynamic power transmission, a bladed component carrying a ring of blade members rotatably mounted to turn about their own axes and having axially extending helically threaded parts for effecting turning movement of the blade members, said component further carrying a servomotor comprising an axially movable piston located between two fluid pressure working chambers, said piston being provided with helical threads engaging the threads of said parts in response to axial movement of said piston, a fluid pressure system comprising connections for supplying fluid to and venting fluid from said chambers and valves means including a first part movable in accordance with movements of said piston and a second part selectively movable to different positions for regulating the adjusted positions of said blades, said piston having a ring of openings through which said parts project, the helically threaded connection between said piston and said parts being provided by external helical threads on said parts and internal helical threads in the walls of the openings in said piston, said parts cooperating to control said connections to provide follow-up movement of the piston in response to movements of said second part to thereby provide a given fixed adjusted position of said blades for each position of said second part.

11. Apparatus as defined in claim 10 in which said first part of said valve means comprises a hollow axially extending hub portion of said piston and said second part comprises a ported tubular valve member slidably engaging the bore of said hub portion of the piston.

References Cited by the Examiner
UNITED STATES PATENTS

| | | | |
|---|---|---|---|
| 2,117,673 | 5/38 | Lysholm | 60—54 |
| 2,162,543 | 6/39 | Banner | 60—54 |
| 2,178,356 | 10/39 | Brunner | 60—54 X |
| 2,377,009 | 5/54 | Heyer | 60—54 X |
| 2,518,925 | 8/50 | Nussbaum | 91—378 X |
| 2,935,898 | 5/60 | Ahlen | 60—54 X |
| 3,021,676 | 2/62 | Tuck et al. | 60—54 |

JULIUS E. WEST, *Primary Examiner.*

EDGAR W. GEOGHEGAN, *Examiner.*